United States Patent [19]

Broghammer et al.

[11] Patent Number: 4,957,013
[45] Date of Patent: Sep. 18, 1990

[54] SPINDLE DRIVE FOR A COORDINATE MEASURING MACHINE

[75] Inventors: Heinz Broghammer, Zimmern; Gerhard Band, Oberndorf, both of Fed. Rep. of Germany

[73] Assignee: Mauser-Werke Oberndorf GmbH, Fed. Rep. of Germany

[21] Appl. No.: 393,995

[22] Filed: Aug. 15, 1989

[30] Foreign Application Priority Data

Sep. 8, 1988 [DE] Fed. Rep. of Germany ....... 3830526

[51] Int. Cl.[5] .............................................. F16H 25/24
[52] U.S. Cl. ..................................... 74/89.15; 33/503; 74/411; 74/424.8 R; 384/536
[58] Field of Search ............... 74/411, 89.15, 424.8 R; 33/1 M, 503; 384/536

[56] References Cited

U.S. PATENT DOCUMENTS

| 2,922,680 | 1/1960 | Marquis et al. | 384/536 |
| 3,466,104 | 9/1969 | Norrie et al. | 384/536 |
| 3,913,412 | 10/1975 | Hart et al. | 74/424.8 R |
| 4,483,209 | 11/1984 | Dietrich et al. | 74/424.8 R X |
| 4,530,251 | 7/1985 | Henle | 74/89.15 |
| 4,597,303 | 7/1986 | Nakaya | 74/424.8 R X |
| 4,754,554 | 7/1988 | Raleigh | 74/89.15 X |

FOREIGN PATENT DOCUMENTS 8132380 1/1983 Fed. Rep. of Germany.
3514961 10/1986 Fed. Rep. of Germany.

*Primary Examiner*—Allan D. Herrmann
*Attorney, Agent, or Firm*—Scully, Scott, Murphy & Presser

[57] ABSTRACT

A spindle drive for a coordinate measuring machine, wherein a spindle nut which is fastened within a receiving member is seated on a driven threaded spindle. Intermediate the receiving member and a retaining member, the spindle is fixedly connected with a component which is to be driven, through the interposition of roll bodies for producing a compensating clearance radially relative to the spindle axis and a compensating or equilibrating for wobbling motions of the spindle.

5 Claims, 2 Drawing Sheets

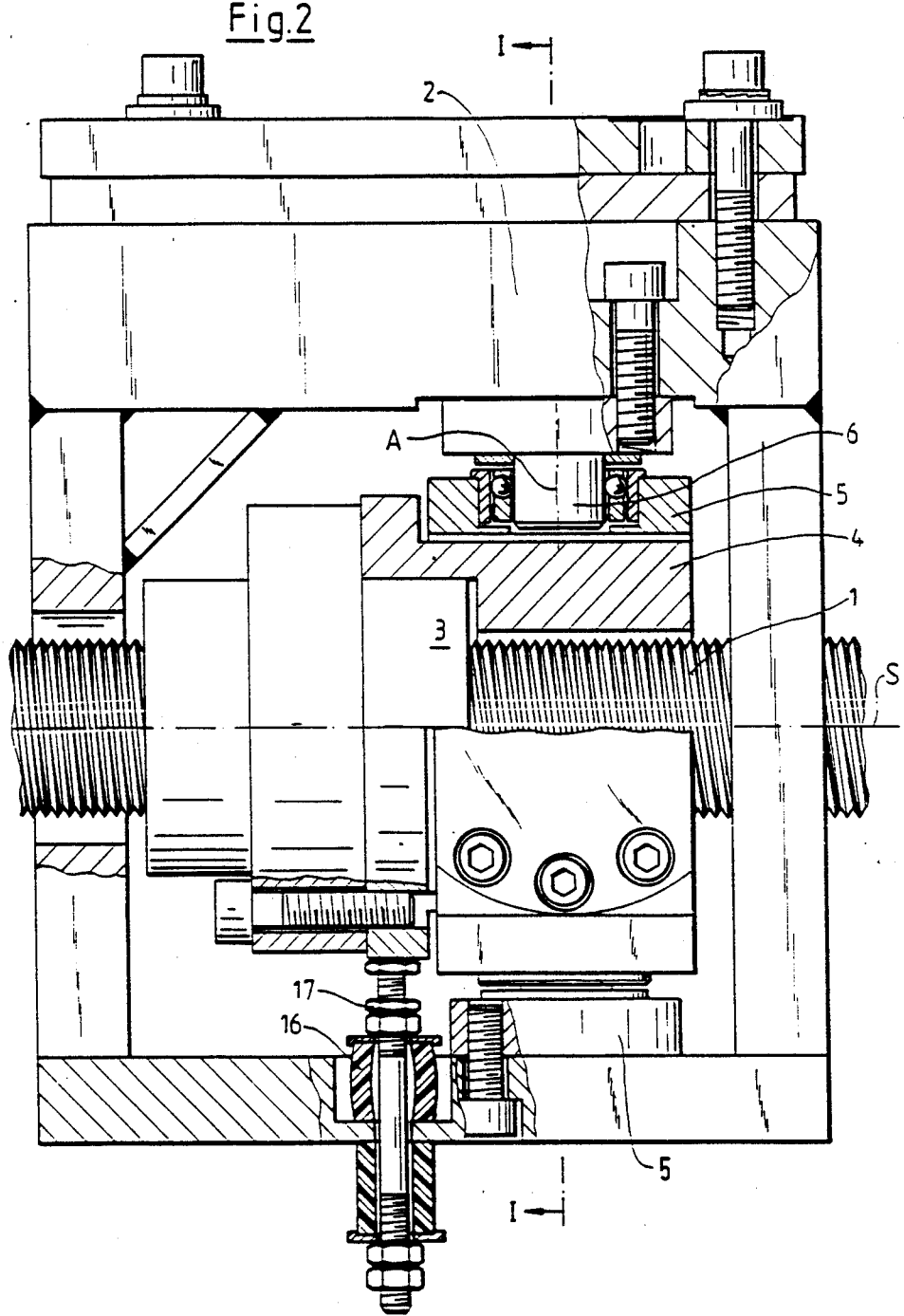

SPINDLE DRIVE FOR A COORDINATE MEASURING MACHINE

BACKGROUND OF THE INVENTION

1. Field of the Invention

The present invention relates to a spindle drive for a coordinate measuring machine, wherein a spindle nut which is fastened within a receiving member is seated on a driven threaded spindle, and whereby, intermediate the receiving member and a retaining member, the former is fixedly connected with a component which is to be driven, through the interposition of roll bodies for producing a compensating clearance radially relative to the spindle axis and for compensating wobbling motions of the spindle.

2. Discussion of the Prior Art

A spindle drive of that particular type is described in the specification of German Laid-Open Patent Appln. 35 14 961. In order to prevent a radial impact from the threaded spindle from being transmitted to the component which is to be driven; in this instance, the spindle sleeve, roll bodies are arranged intermediate planar bearing or support surfaces which extend perpendicular to the spindle axis. Any wobbling motion of the spindle axis does not transmit itself to the component which is to be driven, inasmuch as the latter is movable on a spherical surface about the spindle nut. This spherical surface is extremely complex and expensive in the manufacture thereof. It is also comparatively large in size. Correspondingly large in size are the ball bearings which are arranged thereon. In order to connect the spindle nut with the spindle sleeve secured against rotation relative thereto during a rotation of the spindle, there are provided ball-and-socket joint bolts, in conformance with the disclosure of German OS 35 14 961. These engage into sleeves which are larger in diameter. As a result thereof, the turning moment or torque transmission, or, in essence, the rotationally-secured connection between the spindle sleeve and the spindle nut is not free from play.

In the disclosure of German Petty Patent 81 32 380, there is elucidated a further spindle drive for a coordinate measuring machine. In this particular drive, there is avoided any change in the position of the measuring carriage subsequent to the implemented advancing movement. The receiving or pickup member possesses a blind bore with a fitted sleeve extending at right angles to the spindle axis. A carrier trunnion engages into the sleeve, and is connected with a retainer component. Arranged within the blind bore is a bearing cage incorporating balls which are arranged about a circularly-extending line for the guidance of the carrier trunnion. Any radial impact of the spindle or wobbling movements lead to the generating of lateral forces which act on the measuring carriage. These forces can be avoided through a correspondingly complicated spindle.

SUMMARY OF THE INVENTION

Accordingly, it is an object of the present invention to set forth the provision of a spindle drive of the above-mentioned type in which the spindle nut is additionally connected with the retaining component so as to be free from play with respect to a rotation about the spindle axis.

Inventively, the above object is achieved for a spindle drive of the above mentioned type in that a spacer ring or collar is arranged intermediate the receiving member and the retaining component, wherein the receiving member is connected with the spacer ring through the intermediary of a first compensating device which facilitates the presence of a compensating play in a first perpendicular direction relative to the spindle axes. The spacer ring is connected with the retainer part through a further compensating device, which facilitates the presence of a compensating play in a second direction extending perpendicular to the spindle axis and to the first direction; and in which both compensating devices each possess at least one cylindrical carrier trunnion which is guided within a ball bearing ring so as to be movable in the first or, respectively, second direction and is free from play in the direction of the spindle axis, whereby the axes of the carrier trunnions and the ball bearing rings are located in the first and, respectively, second direction and intersect the spindle axis at a common point.

As a result of the foregoing, it becomes possible to employ a simple threaded spindle in which there can be counteracted larger operating or running errors. For example, such a threaded spindle can be constituted of a rolled threaded spindle. Any radial impact of the threaded spindle does not transmit itself to the retaining component inasmuch as the compensating devices absorb this radial impact in all radial directions relative to the spindle axis. Wobbling movements of the spindle do not transmit themselves to the retaining component, inasmuch as the carrier trunnions of the compensating devices are pivotable within the ball rings about the axes of the carrier trunnions. However, in the axial direction of the spindle axis, the retaining component is connected with the spindle nut so as to be free from play since the carrier trunnions are seated in the ball bearing rings so as to be free from play in this direction. Concurrently obtained therefrom is the aspect that the spindle nut together with the retainer component is also secured against rotation therewith with respect to any rotation about the spindle axis.

It is also expedient that all compensating devices be identically constructed and are of a simple nature in their structures.

Pursuant to a preferred embodiment of the invention, both compensating devices include each two carrier trunnions and ball bearing rings, which are located opposite each other relative to the spindle axis, whose axes lie in a single line and which intersect the spindle axis at one point. Achieved thereby is a symmetrical construction which expediently enhances the stability of the system.

In order to suppress any build-up in the amplitude of vibrations which are encountered at certain speeds of rotation for the threaded spindle, a damping element is effectively arranged between the retainer component and the receiving member.

BRIEF DESCRIPTION OF THE DRAWINGS

Further advantageous configurations and features of the invention may now be readily ascertained from the following detailed description of an exemplary embodiment thereof, taken in conjunction with the accompanying drawings; in which:

FIG. 2 illustrates a sectional view taken along line II—II in FIG. 1.

DETAILED DESCRIPTION

Figure 1:
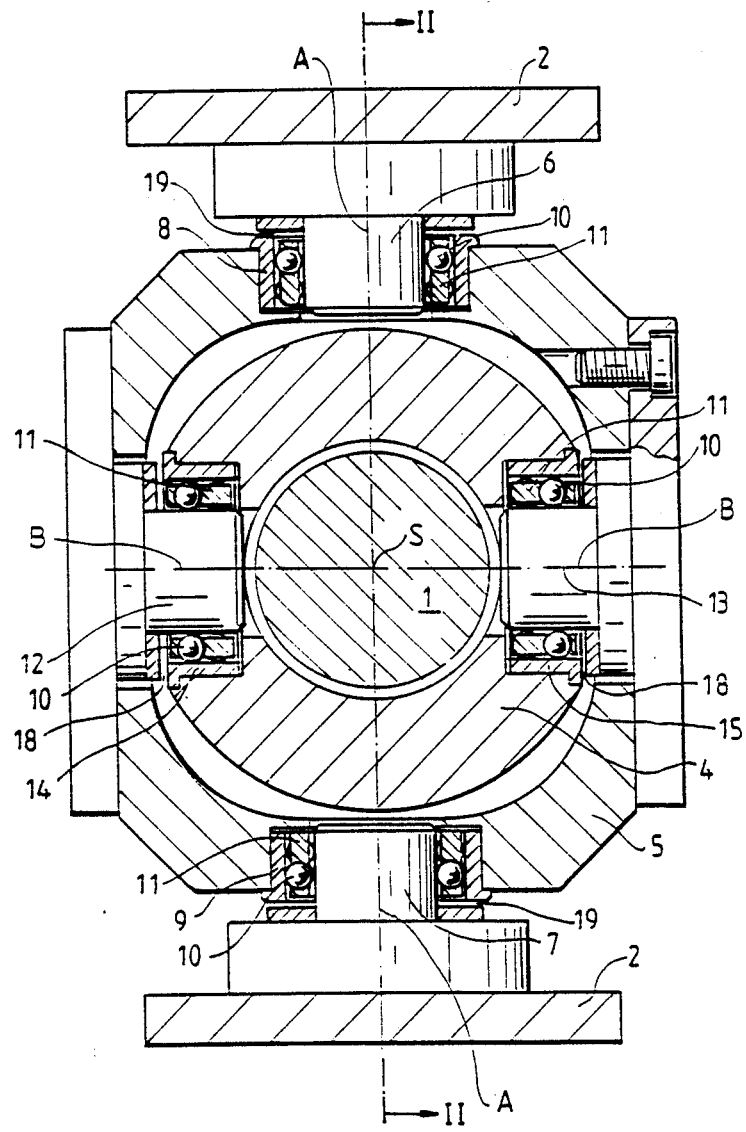
FIG. 1 illustrates a sectional view through the inventive spindle drive taken along line I—I in FIG. 2.

A spindle drive possesses a threaded spindle 1. The spindle axis is designated with reference numeral S. The threaded spindle 1 is adapted to be driven through the intermediary of a suitable motor (not shown). The spindle is adapted to provide for the driving of a measuring carriage (not shown) of the coordinate measuring machine, whereby the measuring carriage is fastened on a mounting or retaining component 2.

On the threaded spindle 1 there is seated a spindle nut 3 which is fastened in a receiving member 4. The receiving member 4 encompasses the threaded spindle 1. A spacer ring or collar 5 is arranged between the receiving member 4 and the retaining component 2. The first compensating means will be described as follows.

Fastened on the retaining component 2 are two cylindrical carrier or support trunnions 6, 7. Bearing sleeves 8, 9 are inserted into blind bores which are formed in the spacer ring 5. Positioned in these bearing sleeves are ball bearing rings 10 in bearing cages 11. The ball bearing rings 10 receive the carrier trunnions 6, 7 so as to be free from play in the direction of their circumferences. The carrier trunnions 6, 7 are displaceable within the ball bearing rings 10 in the direction of axes A. The axes A are located along a single line extending perpendicular to the spindle axis S and intersect the latter. The second compensating means will be described as follows.

Fastened to the spacer ring or collar 5 are further carrier or support trunnions 12, 13. The axes B of the trunnions are located along a single line which extends perpendicular to the axis A and perpendicular to the spindle axis S, and which intersect the spindle axis S at the same point as the axes A.

For the carrier trunnions 12, 13 there are provided bearing sleeves or bushings 14, 15 on the receiving member 4. Arranged in these sleeves are the ball bearing rings 10 in bearing cages 11. The carrier trunnions 12, 13 are retained by means of the ball bearing rings 10 within the bearing sleeves 14, 15 so as to be free from play radially relative to the axis B. The trunnions are displaceable along the direction of the axis B and rotatable about the axis B.

A damping element 16 is arranged on component 2. This damping element supports itself against the receiving member 4 through the action of an adjustable screw connection 17.

The function of the herein described device is as follows:

At a radial impact of the threaded spindle 1, which is also experienced by the spindle nut 3 and the receiving member 4, this impact is not transmitted along the direction of the axis B to the spacer ring 5, inasmuch as due to the displaceable support of the carrier trunnions 12, 13, the receiving member 4 can shift itself with regard to the spacer ring 5 within the region of the free space or clearance 18. The radial impact is not transmitted along the direction A by the spacer ring 5 to the retainer component 2 since the carrier trunnions 6, 7 are able to displace within the region of the clearance 19.

Similarly, wobbling movements of the threaded spindle 1 are not transmitted to the retaining component 2 inasmuch as the carrier trunnions 6, 7, 12, 13 can freely pivot about the respective axes A and B.

Any axial movement of the spindle nut 3 is transmitted free from play to the retaining component 2 since the carrier trunnions 6, 7, 12 and 13 are seated radially relative to their respective axes A and B in the spacer ring 5 or, respectively, the receiving member 4, so as to be free from play.

The spindle nut 3 is connected with the retaining component 2 so as to be free from play at a rotation about the spindle axis S, since the carrier trunnions 6, 7, 12 and 13 are supported radially relative to their respective axes A or B.

What is claimed is:

1. A spindle drive for a coordinate measuring machine; comprising a driven threaded spindle having an axis, a spindle nut being seated on said spindle and fastened in a receiving member; a retaining component connected with said driven threaded spindle through a plurality of compensating means so as to facilitate a radial compensating play relative to the spindle axis and a compensating of wobbling movements of the spindle between said receiving member and retaining component; a spacer ring intermediate said receiving member and said retaining component; said compensating means connecting said spacer ring with said receiving member to facilitate a compensating play in a first perpendicular direction relative to the spindle axis; second compensating means connecting said spacer ring with the retaining component to facilitate a compensating play in a second direction perpendicular to the spindle axis and to the first perpendicular direction, and said first and second compensating means each include at least one cylindrical carrier trunnion; a ball bearing ring for guiding each trunnion in, respectively, said first or second direction and free from play along the direction of the spindle axis, the axes of the carrier trunnions and the ball bearing rings extending in, respectively, the first and second direction and intersecting the spindle axis at a common point.

2. A spindle drive as claimed in claim 1, wherein said first and second compensating means each include two carrier trunnions and ball bearing rings oppositely located relative to the spindle axis, and the axes of said trunnions being located along a single line and intersecting the spindle axis.

3. A spindle drive as claimed in claim 1, wherein a bearing sleeve is inserted in each said receiving member and spacer ring for receipt of the ball bearing rings.

4. A spindle drive as claimed in claim 1, wherein each said carrier trunnion is guided in said ball bearing ring for rotation about its axis and free from play radially relative to said axis.

5. A spindle drive as claimed in claim 1, wherein a damping element is operatively connected intermediate said retaining component and said receiving member.

* * * * *